(12) United States Patent
Yang et al.

(10) Patent No.: US 7,754,111 B1
(45) Date of Patent: Jul. 13, 2010

(54) METHOD OF MAKING SILVER VANADIUM OXYFLUORIDES FOR NONAQUEOUS LITHIUM ELECTROCHEMICAL CELLS

(75) Inventors: Jingsi Yang, Williamsville, NY (US); Esther S. Takeuchi, East Amherst, NY (US); Randolph Leising, Williamsville, NY (US)

(73) Assignee: Greatbatch Ltd., Clarence, NY (US)

( * ) Notice: Subject to any disclaimer, the term of this patent is extended or adjusted under 35 U.S.C. 154(b) by 566 days.

(21) Appl. No.: 11/811,556

(22) Filed: Jun. 11, 2007

Related U.S. Application Data

(60) Provisional application No. 60/804,294, filed on Jun. 9, 2006.

(51) Int. Cl.
*H01B 1/06* (2006.01)

(52) U.S. Cl. ............... 252/520.3; 252/520.4; 423/594.8

(58) Field of Classification Search ............ 252/520.3, 252/520.4; 423/46, 62, 594.8; 427/126.1
See application file for complete search history.

(56) References Cited

U.S. PATENT DOCUMENTS

| | | | |
|---|---|---|---|
| 5,435,874 A | 7/1995 | Takeuchi et al. | |
| 5,571,640 A | 11/1996 | Takeuchi et al. | |
| 5,674,645 A | 10/1997 | Amatucci et al. | |
| 6,087,042 A | 7/2000 | Sugiyama et al. | |
| 6,551,747 B1 | 4/2003 | Gan | |
| 6,582,545 B1 | 6/2003 | Thiebolt, III et al. | |
| 6,653,156 B2 | 11/2003 | Hayashi et al. | |
| 6,797,017 B2 * | 9/2004 | Leising et al. | ............. 29/623.1 |
| 2002/0187372 A1 | 12/2002 | Hall et al. | |
| 2004/0144641 A1 | 7/2004 | De Nora et al. | |
| 2004/0191633 A1 | 9/2004 | Johnson et al. | |
| 2006/0019163 A1 | 1/2006 | Amatucci et al. | |

FOREIGN PATENT DOCUMENTS

WO WO2008/144271 * 11/2008

OTHER PUBLICATIONS

Sorensen et al "Ag4V2O6F2: An electrochemically active and high silver density phase"; JACS 2005, 127, 6347-6352 (pub Apr. 7, 2005).*
Bertoni et al "Electrical and optical characterization of Ag2V4O11 and Ag4V2O6F2", J Electroceram 2007 18:189-195 (pub online Mar. 3, 2007).*

* cited by examiner

*Primary Examiner*—Mark Kopec
(74) *Attorney, Agent, or Firm*—Michael F. Scalise

(57) ABSTRACT

An electrochemical cell comprising a lithium anode and a fluorinated silver vanadium oxide cathode activated with a nonaqueous electrolyte is described. The fluorinated silver vanadium oxide is of the formula $Ag_4V_2O_{11-x}F_x$, wherein x ranges from about 0.02 to about 0.3.

7 Claims, 3 Drawing Sheets

X-ray diffraction spectrum of the low temperature prepared $Ag_2V_4O_{11-x}F_x$

METHOD OF MAKING SILVER VANADIUM OXYFLUORIDES FOR NONAQUEOUS LITHIUM ELECTROCHEMICAL CELLS

CROSS-REFERENCE TO RELATED APPLICATION

This application claims priority from U.S. Provisional Application Ser. No. 60/804,294, filed Jun. 9, 2006.

BACKGROUND OF THE INVENTION

1. Field of the Invention

The present invention generally relates to the conversion of chemical energy to electrical energy. More particularly, this invention relates to a lithium electrochemical cell of a new solid silver vanadium oxyfluoride cathode active material. A preferred cell is of a lithium anode coupled with a cathode of a fluorinated silver vanadium oxide of the formula $Ag_2V_4O_{11-x}F_x$, wherein x ranges from about 0.02 to about 0.3.

2. Prior Art

Lithium electrochemical cells having silver vanadium oxide (SVO) as a cathode active material, especially the ε-phase compound $Ag_2V_4O_{11}$, have been widely used as the power source for cardiac defibrillators, and the like. In order to further improve the energy density and output power of cells for implantable devices, however, an alternative cathode active material is sought.

Fluorinated silver vanadium oxide is a brand new material system compared with the extensively studied silver vanadium oxides.

SUMMARY OF THE INVENTION

It is, therefore, an object of this invention to provide an electrochemical cell comprising a lithium anode, a cathode comprising fluorinated silver vanadium oxide of the formula $Ag_2V_4O_{11-x}F_x$, wherein x ranges from about 0.02 to about 0.3 as a cathode active material, and an electrolyte activating the anode and the cathode. When used as a cathode material coupled with lithium, such cells have a specific capacity comparable to that of a Li/SVO ($Ag_2V_4O_{11}$) cell. However, the fluorine is believed to significantly diminish dissolution of vanadium into the liquid electrolyte and its subsequent deposition onto the lithium anode. This deposited vanadium has a detrimental effect in the form of voltage delay when the cell is pulse discharged, for example, to charge the capacitors of a cardiac defibrillator. Therefore, the result of the present cathode active material is improved pulse discharge characteristics through diminished voltage delay.

The foregoing and additional objects, advantages, and characterizing features of the present invention will become increasingly more apparent upon a reading of the following detailed description together with the included drawings.

DETAILED DESCRIPTION OF THE PREFERRED EMBODIMENTS

Figure 1:
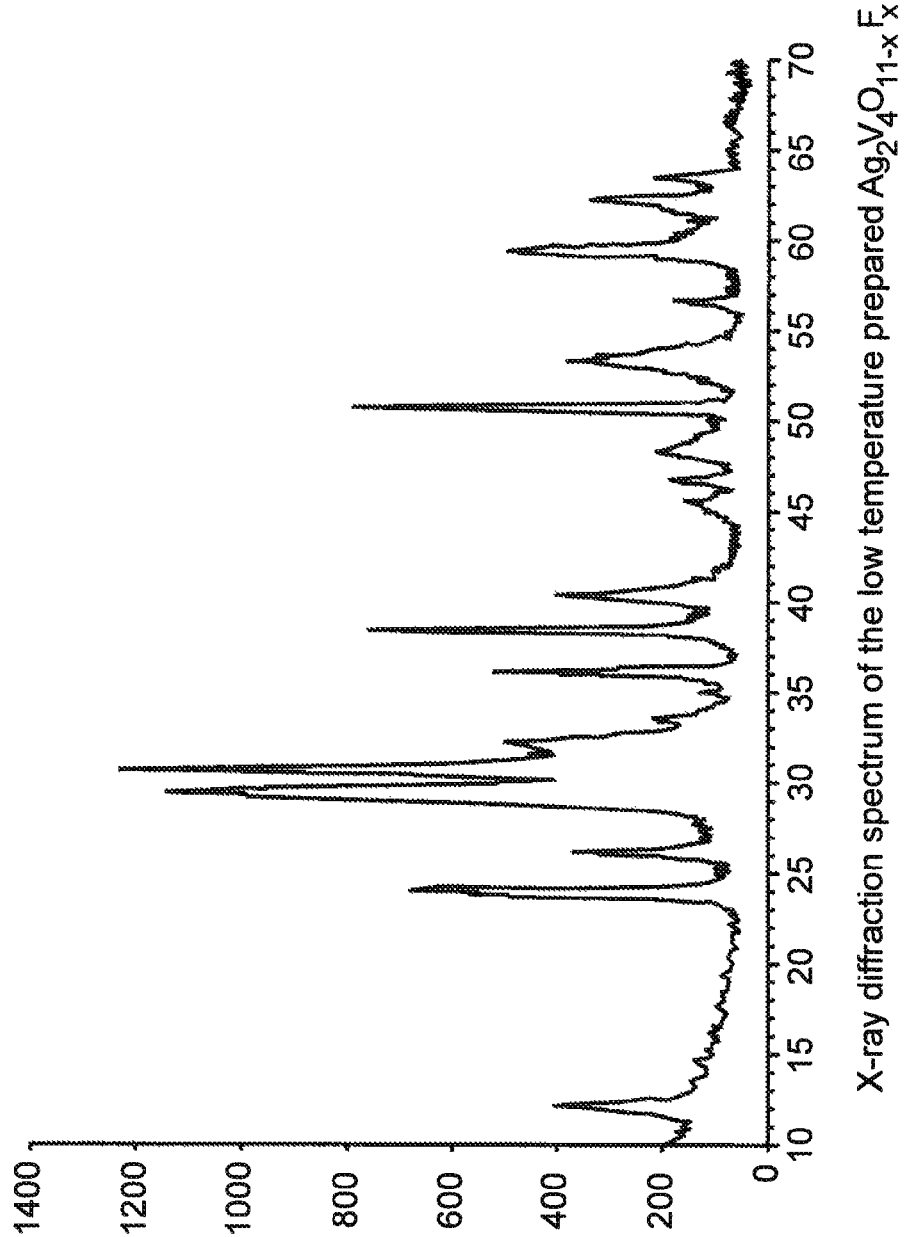
FIG. 1 is an x-ray diffraction (XRD) pattern of $Ag_2V_4O_{11-x}F_x$ prepared by the solid state synthesis according to the present invention.

In describing the present invention, the following term is used.

The term "pulse" means a short burst of electrical current of significantly greater amplitude than that of a pre-pulse current or open circuit voltage immediately prior to the pulse. A pulse train consists of at least one pulse of electrical current. The pulse is designed to deliver energy, power or current. If the pulse train consists of more than one pulse, they are delivered in relatively short succession with or without open circuit rest between the pulses.

In performing accelerated discharge testing of a cell, an exemplary pulse train may consist of one to four 5- to 20-second pulses (23.2 mA/cm$^2$) with about a 10 to 30 second rest, preferably about 15 second rest, between each pulse. A typically used range of current densities for cells powering implantable medical devices is from about 15 mA/cm$^2$ to about 50 mA/cm$^2$, and more preferably from about 18 mA/cm$^2$ to about 35 mA/cm$^2$. Typically, a 10-second pulse is suitable for medical implantable applications. However, it could be significantly shorter or longer depending on the specific cell design and chemistry and the associated device energy requirements. Current densities are based on square centimeters of the cathode electrode.

An electrochemical cell that possesses sufficient energy density and discharge capacity required to meet the vigorous requirements of implantable medical devices comprises an anode of lithium. An alternate anode comprises a lithium alloy such as a lithium-aluminum alloy. The greater the amounts of aluminum present by weight in the alloy, however, the lower the energy density of the cell.

The form of the anode may vary, but preferably it is a thin metal sheet or foil of lithium metal, pressed or rolled on a metallic anode current collector, i.e., preferably comprising titanium, titanium alloy or nickel. Copper, tungsten and tantalum are also suitable materials for the anode current collector. The anode current collector has an extended tab or lead contacted by a weld to a cell case of conductive metal in a case-negative electrical configuration. Alternatively, the anode may be formed in some other geometry, such as a bobbin shape, cylinder or pellet, to allow for a low surface cell design.

The electrochemical cell of the present invention further comprises a cathode of electrically conductive material that serves as the counter electrode. The cathode is preferably of solid materials comprising a silver-containing compound, a vanadium-containing compound and a fluorine-containing compound to provide a fluorinated silver vanadium oxide active material having the general formula $Ag_2V_4O_{11-x}F_x$, wherein x ranges from about 0.02 to about 0.3. This active material is preferably synthesized by a solid state-based synthesis method. This means that the reactive ingredients are in a solid phase in comparison to a liquid or gaseous state.

In particular, suitable silver-containing ingredients include Ag, $Ag_2O$, $Ag_2CO_3$, $AgNO_3$, $AgNO_2$, $Ag_2O_2$, $AgVO_3$, $Ag(CH_3CO_2)$, and mixtures thereof. The vanadium-containing compound is selected from $NH_4VO_3$, $AgVO_3$, VO, $VO_{1.27}$, $VO_2$, $V_2O_4$, $V_2O_3$, $V_3O_5$, $V_4O_9$, $V_6O_{13}$, $V_2O_5$, and mixtures thereof, the latter being preferred. The fluorine-containing material is selected from AgF, $VOF_3$, and mixtures thereof. The silver to vanadium molar ratio is about 1:2, but the amount of fluorine can vary widely. Depending on the composition of the product active compound, the starting materials are homogenized by low mechanical energy mixing, or they can be extensively ground to cause certain high mechanical energy-induced chemical reactions prior to the heating process. Once the precursors are prepared, they are either directly heated at temperatures ranging from about 250° C. to about 400° C., preferably about 300° C., with the heating duration lasting from about 0.5 hour to about 24 hours in an air atmosphere or under a controlled atmosphere.

Before fabrication into an electrode for incorporation into an electrochemical cell, the fluorinated silver vanadium oxide of the formula $Ag_2V_4O_{11-x}F_x$, wherein x ranges from 0.02 to 0.3 is preferably mixed with a binder material such as a powdered fluoro-polymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium, stainless steel, and mixtures thereof. The preferred cathode active mixture thus includes a powdered fluoro-polymer binder present at a quantity of at least about 3 weight percent, a conductive diluent present at a quantity of at least about 3 weight percent and from about 80 to about 98 weight percent of the cathode active material.

Cathode components for incorporation into the cell may be prepared by rolling, spreading or pressing the cathode active mixture onto a suitable current collector selected from the group consisting of stainless steel, titanium, tantalum, platinum, gold, aluminum, cobalt nickel alloys, highly alloyed ferritic stainless steel containing molybdenum and chromium, and nickel-, chromium-, and molybdenum-containing alloys. Aluminum and titanium are preferred.

A preferred method of cathode preparation is by contacting a blank cut from a free-standing sheet of cathode active material to a current collector. Blank preparation starts by taking granular fluorinated silver vanadium oxide and adjusting its particle size to a useful range by attrition or in a grinding step. The finely divided active material is then preferably mixed with carbon black and/or graphite as conductive diluents and a powder fluoro-resin such as polytetrafluoroethylene powder as a binder material to form a depolarizer admixture. This is typically done in a solvent of either water or an inert organic medium such as mineral spirits. The mixing process provides for fibrillation of the fluoro-resin to ensure material integrity. After mixing sufficiently to ensure homogeneity in the admixture, the active admixture is removed from the mixer as a paste.

Following the mixing step, the solvent is vacuum filtered from the paste to adjust the solvent content to about 0.25 cc to about 0.35 cc per gram of solids, i.e., the solids comprising the fluorinated silver vanadium oxide active material, the conductive diluent and the binder. The resulting filter cake is fed into a series of roll mills that compact the active admixture into a thin sheet having a tape form, or the active filter cake is first run through a briquette mill. In the latter case, the active admixture is formed into small pellets which are then fed into the roll mills.

Typically, the compacting step is performed by roll mills comprising two to four calender mills that serve to press the admixture between rotating rollers to provide a free-standing sheet of the active material as a continuous tape. In a preferred method, cathodes are made from blanks prepared as described in U.S. Pat. No. 6,582,545 to Thiebolt III et al. This patent is assigned to the assignee of the present invention and incorporated herein by reference. It teaches that the basis weight of an electrode active admixture, for example one including fluorinated silver vanadium oxide is formed into an electrode structure from an admixture paste subjected to a calendering process using a secondary calendering step performed in a direction reverse or orthogonal to that used to form the initial sheet tape. Orthogonal or reverse feed of the electrode active admixture provides for fibrillation of the fluoro-polymeric binder in other than the initial direction. This lets the binder spread in directions transverse to the initial direction.

The tape preferably has a thickness in the range of from about 0.0015 inches to about 0.020 inches. The outer edges of the tape leaving the rollers are trimmed and the resulting tape is subsequently subjected to a drying step under vacuum conditions. The drying step serves to remove any residual solvent and/or water from the active material. Alternatively, the process can include the drop wise addition of a liquid electrolyte into the active mixture prior to the initial calendering step to enhance the performance and rate capacity of an assembled electrochemical cell. The active sheet tape can be stored for later use, or fed on a conveyor belt to a punching machine. The punching operation forms the sheet tape into active blanks of any dimension needed for preparation of an electrode component for use in a high energy density electrochemical cell.

U.S. Pat. Nos. 5,435,874 and 5,571,640, both to Takeuchi et al., describe the preparation of a cathode component by an SVO sheeting process. These Takeuchi et al. patents, which are assigned to the assignee of the present invention and incorporated herein by reference, are equally applicable to form active sheet structures containing a fluorinated silver vanadium oxide. The resulting cathode blanks may be in the form of one or more plates operatively associated with at least one or more plates of anode material or, in the form of a strip wound with a corresponding strip of anode material in a structure similar to a "jellyroll".

In one embodiment, the cathode has a fluorinated silver vanadium oxide contacted to both sides of the cathode current collector. In another embodiment, the cathode has a sandwich design as described in U.S. Pat. No. 6,551,747 to Gan. The sandwich cathode design comprises a first active material of a relatively high energy density but a relatively low rate capability in comparison to a second cathode active material. Fluorinated carbon is a preferred first cathode active material while a fluorinated silver vanadium oxide is a preferred second active material. Preferred fluorinated carbon compounds are represented by the formula $(CF_x)_n$ wherein x varies between about 0.1 to 1.9 and preferably between about 0.5 and 1.2, and $(C_2F)_n$ wherein the n refers to the number of monomer units which can vary widely.

One exemplary sandwich cathode has the following configuration: fluorinated silver vanadium oxide/current collector/$CF_x$/current collector/fluorinated silver vanadium oxide.

Another exemplary sandwich cathode electrode configuration is: fluorinated silver vanadium oxide/current collector/fluorinated silver vanadium oxide/$CF_x$/fluorinated silver vanadium oxide/current collector/fluorinated silver vanadium oxide.

Still another configuration for an electrochemical cell with a sandwich electrode has a lithium anode and a cathode configuration of: fluorinated silver vanadium oxide/current collector/$CF_x$, with the fluorinated silver vanadium oxide facing the lithium anode.

In order to prevent internal short circuit conditions, the cathode is physically segregated from the lithium anode by a separator. The separator is of electrically insulative material that is chemically unreactive with the anode and cathode active materials and both chemically unreactive with and insoluble in the electrolyte. In addition, the separator material has a degree of porosity sufficient to allow there through of the electrolyte during the electrochemical reactions of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX® (Chemplast Inc.), a polypropylene membrane commercially available under the designation CELGARD® (Celanese Plastic Company, Inc.), a membrane commercially available under the designation DEXIGLAS® (C.H. Dexter, Div., Dexter Corp.), and a membrane commercially available under the designation TONEN®.

The electrochemical cell of the present invention further includes a nonaqueous, ionically conductive electrolyte serving as a medium for migration of ions between the anode and the cathode electrodes during electrochemical reactions of the cell. The electrochemical reaction at the electrodes involves conversion of ions in atomic or molecular forms that migrate from the anode to the cathode. Thus, suitable nonaqueous electrolytes are substantially inert to the anode and cathode materials, and they exhibit those physical properties necessary for ionic transport, namely, low viscosity, low surface tension and wettability.

A suitable electrolyte has an inorganic, ionically conductive lithium salt dissolved in a mixture of aprotic organic solvents comprising a low viscosity solvent and a high permittivity solvent. Preferred lithium salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6FSO_3$, $LiO_2CCF_3$, $LiSO_6F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, triglyme, tetraglyme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-2-pyrrolidone (NMP), and mixtures thereof. In the present invention, the preferred electrolyte for a Li/fluorinated silver vanadium oxide cell is 0.8M to 1.5M $LiAsF_6$ or $LiPF_6$ dissolved in a 50:50 mixture, by volume, of propylene carbonate and 1,2-dimethoxyethane.

The preferred form of the electrochemical cell is a case-negative design wherein the anode/cathode couple is inserted into a conductive metal casing connected to the anode current collector, as is well known to those skilled in the art. A preferred material for the casing is stainless steel, although titanium, mild steel, nickel, nickel-plated mild steel and aluminum are also suitable. The casing header comprises a metallic lid having a sufficient number of openings to accommodate the glass-to-metal seal/terminal pin feedthrough for the cathode. The anode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed, such as by close-welding a stainless steel plug over the fill hole, but not limited thereto. The cell can also be constructed in a case-positive design.

The cell of the present invention is particularly well suited as a power source for an implantable medical device. A typical implantable medical device, such as a cardiac defibrillator, pacemaker, drug pump, neurostimulator, comprises a device housing, and control circuitry contained inside the device housing, an electrochemical cell housed inside the device housing for powering the control circuitry. The preferred cell comprises an anode of lithium, a cathode of fluorinated silver vanadium oxide, a separator preventing direct physical contact between the anode and the cathode, and a nonaqueous electrolyte activating the anode and the cathode. A lead connects the device housing to a body part intended to be assisted by the medical device. Then, the electrochemical cell powers the control circuitry both during a device monitoring mode to monitor the physiology of the body part and a device activation mode to provide a therapy to the body part.

Accordingly, the following examples describe the manner and process of an electrochemical cell according to the present invention, and they set forth the best mode contemplated by the inventors of carrying out the invention, but they are not to be construed as limiting.

Example I

A molar mixture of 0.8 $Ag_2O$, 0.4 AgF and 2$V_2O_5$ was provided. The mixture was initially homogenized by a SPEX 8000 Mixer-Mill in a SPEX 8002 plastic vial. To prepare $Ag_2V_4O_{11-x}F_x$, the amount of fluorine can vary, but the Ag:V ratio must be kept at 1:2. The nominal ratio of Ag:V:F in this mixture was 2:4:0.4.

The mixture was then extensively ground in a SPEX 8001 hardened still vial for about 60 minutes using hardened steel balls. The weight ratio of steel balls to the mixture was about 4:1. After grinding, the resulting active material had a completely different spectrum by XRD analysis than the spectrum before grinding. This indicates that certain chemical reactions were induced by the high mechanical energy of the milling procedure.

Figure 2:
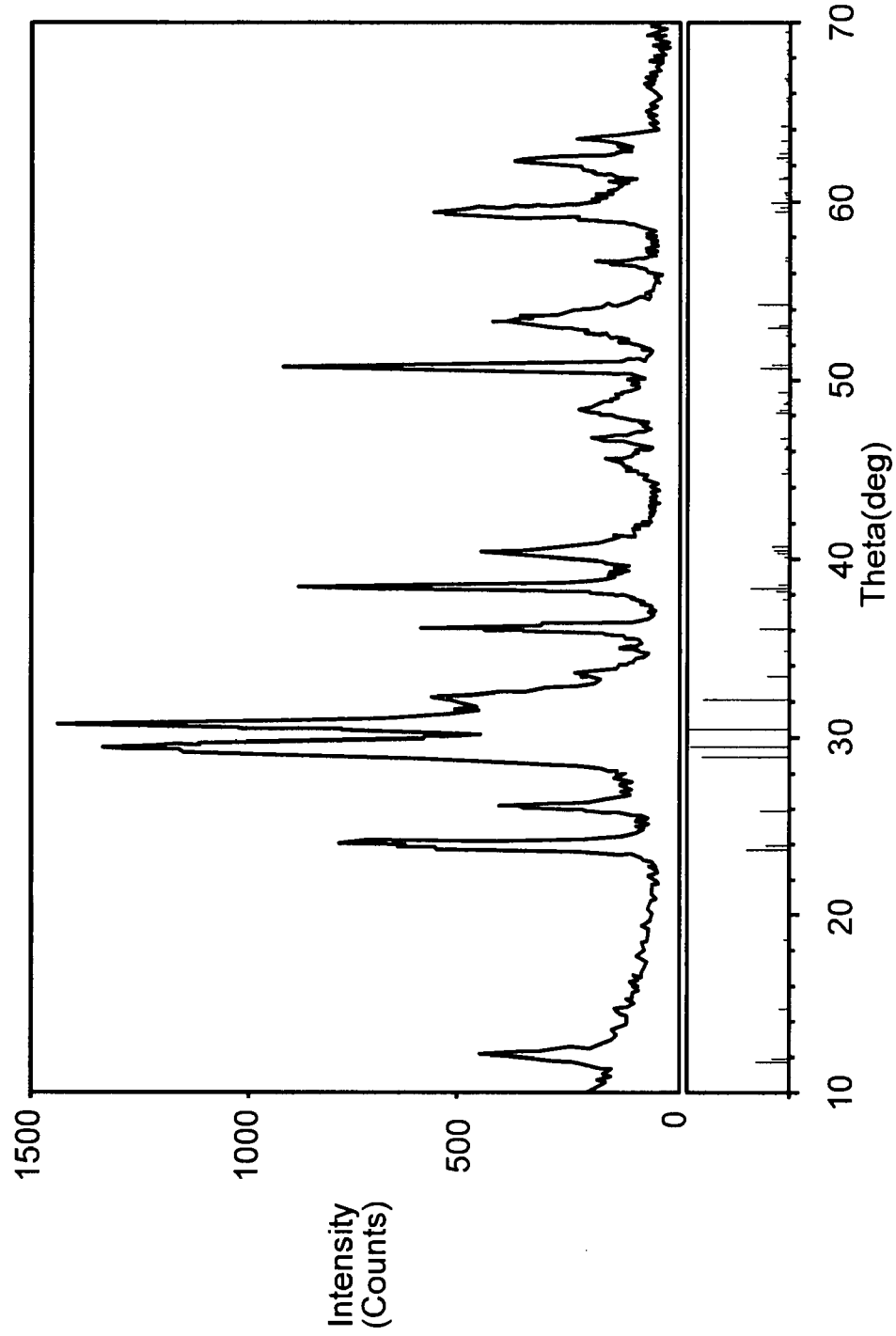
FIG. 2 is an x-ray diffraction pattern of s-phase SVO ($Ag_2V_4O_{11}$).

The active material of this example was then pressed into pellets, placed inside an alumina crucible and covered with powder having the same composition as the pellets. Since fluorine has a tendency to volatilize, the covering powder served to suppress fluorine volatilization from the pellets during the heating process. The crucible was then covered with an alumina cap and placed inside a box oven set at about 300° C. The heating duration varied from about 1 hour to about 2 hours. The as-prepared active product had an XRD spectrum (FIG. 1) that is similar to that of $Ag_2V_4O_{11}$ (FIG. 2), but with significant amounts of residual fluorine. FIG. 2 is a reference spectrum from the International Centre for Diffraction Data (ICDD) for $Ag_2V_4O_{11}$. The very similar diffraction peak positions (lower portion of FIG. 2) means that fluorinated silver vanadium oxide has a structure that is very similar to that of $Ag_2V_4O_{11}$.

The product material was determined to have the stoichiometric structure $Ag_2V_4O_{11-x}F_x$, x=0.25. However, starting with the same ingredient ratios described above in this example, but using different heating protocols, materials having different fluorine contents can be produced within the range of x=0.02 to 0.3. This is shown in Table 1. B/M in the table is the ball to material weight ratio during the milling process.

TABLE 1

| Sample ID | Precursor Mixture (molar ratio) | Synthesis Condition | Product |
|---|---|---|---|
| R428-13E | 0.8 Ag$_2$O<br>0.4 AgF<br>2 V$_2$O$_5$ | B/M = 4<br>mill 60 min.<br>300° C. for 1 h | Ag$_2$V$_4$O$_{11-x}$F$_x$<br>x = 0.28 |
| R428-13H | 0.8 Ag$_2$O<br>0.4 AgF<br>2 V$_2$O$_5$ | B/M = 4<br>mill 60 min.<br>300° C. for 2 hrs | Ag$_2$V$_4$O$_{11-x}$F$_x$<br>x = 0.24 |

Example II

The high rate pulse discharge performance of Ag$_2$V$_4$O$_{11-x}$F$_x$ (x=0.28) from Example I as a cathode material for a lithium cell was evaluated by coin cells. In each coin cell, the cathode had a weight of about 200 mg, and contained about 94 wt % of the fluorinated silver vanadium oxide active material, about 2 wt % KETJENBLACK® carbon black and about 1 wt % graphite as conductive diluents, and about 3 wt % PTFE as a binder material. The lithium anode was physically segregated from the cathode by a suitable separator and the cell was activated with an electrolyte comprising about 1.0M LiAsF$_6$ dissolved in a 50:50 mixture, by volume, of propylene carbonate and 1,2-dimethoxyethane.

Each coin cell was then discharged to deliver a current pulse train every 30 minutes. Each pulse train contained four 32.5 mA (25 mA/cm$^2$) current pulses. Each pulse lasted for about 10 seconds and the pulses were separated from each other by 15 seconds. The cells were allowed to rest on open-circuit voltage between pulse trains.

Figure 3:
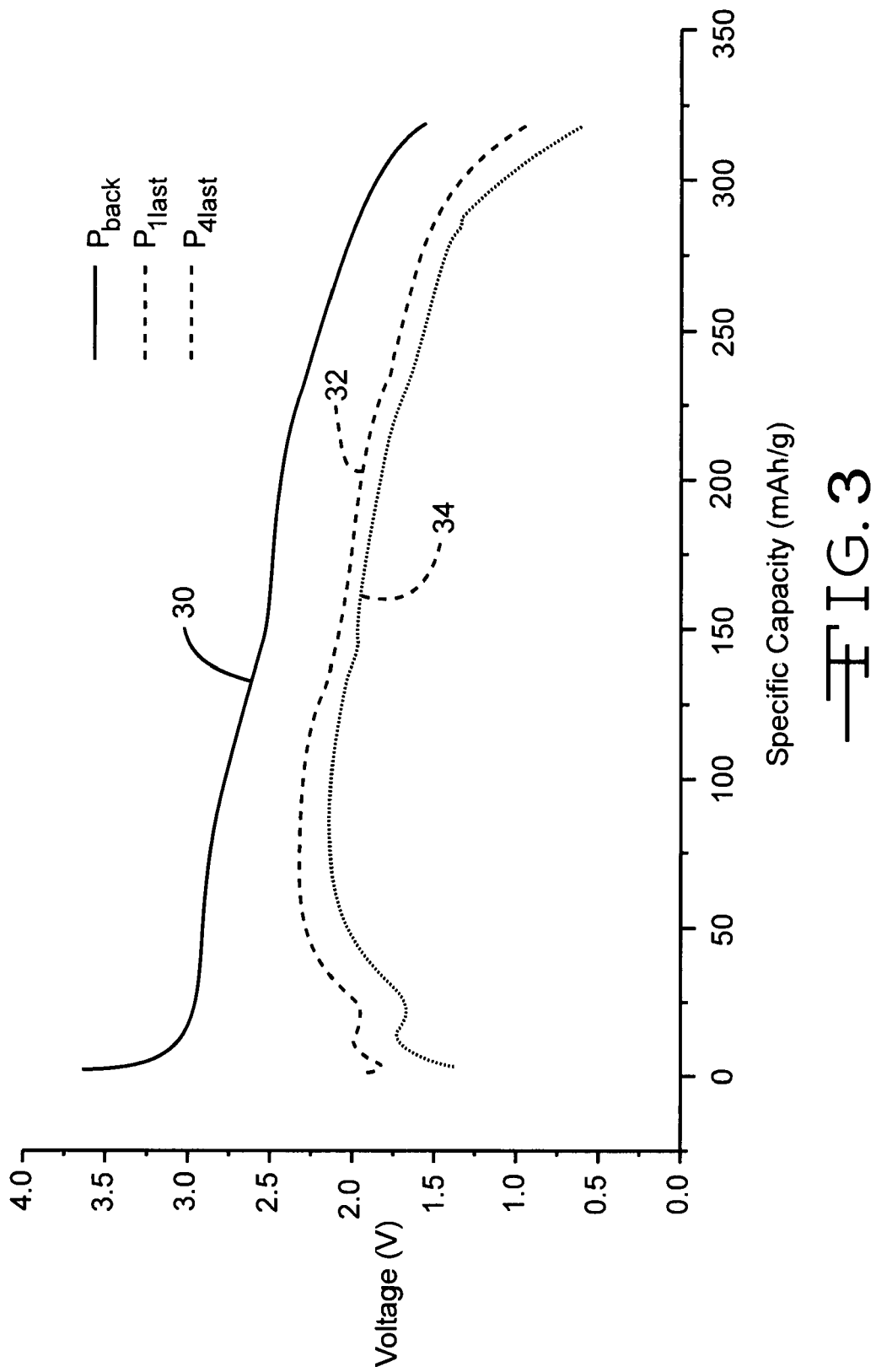
FIG. 3 is a graph of the electrochemical performance of a Li/$Ag_2V_4O_{11-x}F_x$ cell subjected to high rate pulse discharge.

As shown in FIG. 3, the pre-pulse voltage curve 30 (P$_{Back}$) and the voltage curves 32 and 34 at the end of the respective first pulse (P$_{1-last}$) and the forth pulse (P$_{4-last}$) were recorded for a representative one of the cells. This material gave a specific capacity of 320 mAh/gram before the pulse last voltage of the forth pulse reached 0.5 V and the pre-pulse voltage reached 1.58 volts. It is noted that the capacity and voltage profile of this material is very close to that of the commercially used ε-phase SVO (Ag$_2$V$_4$O$_{11}$).

However, the presence of fluorine in the lattice structure is believed to enhance bonding between the vanadium cations and anionic ions, which reduces mobility or dissolution of the vanadium cations. It is known that vanadium cations have a tendency to dissolve into the electrolyte and subsequently precipitate out at the anode-electrolyte interface where they are then the main cause of voltage delay instability of Ag$_2$V$_4$O$_{11}$ in implantable power sources. Voltage delay is a phenomenon typically exhibited in a lithium/silver vanadium oxide cell that has been depleted of about 35% to 70% of its capacity and is subjected to high current pulse discharge applications. The response of a cell that exhibits voltage delay during the application of a short duration pulse or during a pulse train can take one or both of two forms. One form is that the leading edge potential of the first pulse is lower than the end edge potential of the first pulse. In other words, the voltage of the cell at the instant the first pulse is applied is lower than the voltage of the cell immediately before the first pulse is removed. The second form of voltage delay is that the minimum potential of the first pulse is lower than the minimum potential of the last pulse when a series of pulses have been applied.

In any event, minimization and even elimination of voltage delay in a pulse dischargeable lithium cell powering an implantable medical device is desirable, and the present fluorinated silver vanadium oxide have been shown to exhibit less vanadium dissolution because of the bonding effect of the fluorine. In addition to its similar discharge capacity and energy density in comparison to the commonly used silver vanadium oxide active materials, this stability is expected to result in improved voltage delay characteristics for the present fluorinated silver vanadium oxide.

While this invention has been described in conjunction with preferred embodiments thereof, it is evident that many alternatives, modifications, and variations will be apparent to those skilled in the art. Accordingly, it is intended to embrace all such alternatives, modifications and variations that fall within the broad scope of the appended claims.

What is claimed is:

1. A method for providing a cathode active material, comprising the steps of:
   a) providing a silver-containing ingredient selected from the group consisting of Ag, Ag$_2$O, Ag$_2$CO$_3$, AgNO$_3$, AgNO$_2$, Ag$_2$O$_2$, AgVO$_3$, and Ag (CH$_3$CO$_2$);
   b) providing a vanadium-containing compound selected from the group consisting of V$_2$O$_5$, NH$_4$VO$_3$, AgVO$_3$, VO, VO$_{1.27}$, VO$_2$, V$_2$O$_4$, V$_2$O$_3$, V$_3$O$_5$, V$_4$O$_9$, and V$_6$O$_{13}$;
   c) providing a fluorine-containing compound selected from the group consisting of AgF, VOF$_3$, and mixtures thereof;
   d) mixing the silver-containing ingredient, the vanadium-containing compound and the fluorine-containing compound together;
   e) heating the mixture to obtain fluorinated silver vanadium oxide as a cathode active material;
   f) providing a solution of an organic solvent having the fluorinated silver vanadium oxide mixed therein thereby forming an admixture paste;
   g) subjecting the paste to at least one pressing step thereby forming a cathode sheet;
   h) removing any residual solvent material from the cathode sheet;
   i) subjecting the cathode sheet to a forming means that serves to provide at least one cathode plate having a desired geometric shapes; and
   j) laminating at least one of the thusly formed cathode plates on at least one side of a current collector.

2. The method of claim 1 wherein step (f) further comprises the addition of binder and conductor materials.

3. The method of claim 1 wherein step (f) further comprises selecting the solvent material from the group consisting of water and an inert organic material.

4. The method of claim 1 wherein step (d) further comprises mixing the silver-containing material and the vanadium-containing material in a mole ratio of about 1:2.

5. The method of claim 1 wherein step (d) further comprises providing the silver: vanadium: fluorine at a molar ration of 2:4:0.4.

6. The method of claim 1 wherein step (e) further comprises heating the mixture of the silver-containing material, the vanadium-containing material and the fluorine-containing material to a temperature of from about 250° C. to about 400° C.

7. The method of claim 5 wherein step (e) further comprises heating the mixture of the silver-containing material, the vanadium-containing material and the fluorine-containing material for about 0.5 hour to about 24 hours.

* * * * *